(12) United States Patent
Murata (10) Patent No.: US 9,191,526 B2
(45) Date of Patent: Nov. 17, 2015

(54) IMAGE FORMING APPARATUS

(71) Applicant: KYOCERA Document Solutions Inc., Osaka-shi, Osaka (JP)

(72) Inventor: Shuji Murata, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/497,234

(22) Filed: Sep. 25, 2014

(65) Prior Publication Data

US 2015/0092230 A1    Apr. 2, 2015

(30) Foreign Application Priority Data

Sep. 30, 2013    (JP) .................. 2013-203833

(51) Int. Cl.
*G06F 3/12*    (2006.01)
*H04N 1/00*    (2006.01)

(52) U.S. Cl.
CPC .......... *H04N 1/00204* (2013.01); *G06F 3/1204* (2013.01); *G06F 3/1259* (2013.01); *G06F 3/1286* (2013.01); *H04N 1/00129* (2013.01); *H04N 2201/0094* (2013.01)

(58) Field of Classification Search
USPC ....................................................... 358/1.15
See application file for complete search history.

(56) References Cited

U.S. PATENT DOCUMENTS

2005/0275885 A1* 12/2005 Sugiyama .................. 358/1.15
2012/0092709 A1* 4/2012 Maeda et al. .............. 358/1.15

FOREIGN PATENT DOCUMENTS

| JP | 07261950 A | 10/1995 |
| JP | 11065787 A | 3/1999 |
| JP | 2004220125 A | 8/2004 |
| JP | 2010052299 A | 3/2010 |

OTHER PUBLICATIONS

Hitoshi et al., Controlling Apparatus Computer Program and Control Method, Nov. 3, 2010, Machine Translated Japanese Patent Application Publication, JP2010052299, All pages.*

* cited by examiner

*Primary Examiner* — Ngon Nguyen
(74) *Attorney, Agent, or Firm* — Alleman Hall McCoy Russell & Tuttle LLP (57) ABSTRACT

An image forming apparatus includes a notification portion, a print request management table storage portion, and a response portion. When a job is submitted from, among terminal devices of the multiple users, a terminal device of one user, notification portion displays a first message associated with the job on another terminal device of another user. When a print request is transmitted from the other terminal device of the other user in response to the first message, print request management table storage portion registers and stores print request in a predetermined print request management table. When print request is registered in print request management table, response portion displays, on the terminal device of the one user, a second message requesting the one user who submitted the job to respond whether or not the one user intends to print a print object for the other user in response to print request.

6 Claims, 8 Drawing Sheets

| GROUP | USER | IP ADDRESS |
|---|---|---|
| GROUP A | USER A | 192.168.×.○ |
| | USER B | 192.168.×.△ |
| | USER C | 192.168.×.× |
| | USER D | 192.168.×.× |
| GROUP B | USER B | 192.168.×.○ |
| | USER E | 192.168.○.○ |

IMAGE FORMING APPARATUS

INCORPORATION BY REFERENCE

This application is based upon and claims the benefit of priority from the corresponding Japanese Patent Application No. 2013-203833 filed on Sep. 30, 2013, the entire contents of which are incorporated herein by reference.

BACKGROUND

The present disclosure relates to an image forming apparatus configured to notify a job status.

Conventionally, there have been cases where a plurality of users print the same document such as conference material and application forms. Each of the users can perform his or her printing while confirming a job status of an image forming apparatus.

Various technologies are known for notifying the job status of the image forming apparatus. For example, known representative technologies include a technology of notifying a user about a printout process of an image forming apparatus in real time, and a technology of notifying a pre-registered user about a copy function being currently available after a copy job has ended.

In addition, a representative technology of notifying each user that a pre-registered specific user is using an image forming apparatus is known. Furthermore, a representative technology is known in which, when print data identical to print data that has been already printed is transmitted to an image forming apparatus, a notification is made regarding the data being already printed and which user has printed the data.

SUMMARY

An image forming apparatus according to one aspect of the present disclosure includes a communication portion, a notification portion, a print request management table storage portion, and a response portion. The communication portion enables transmission and reception of data among respective terminal devices of multiple users. When a job is submitted from, among the terminal devices of the multiple users, a terminal device of one user, the notification portion displays a first message associated with the job on another terminal device of another user. When a print request is transmitted from the other terminal device of the other user in response to the first message, the print request management table storage portion registers and stores the print request in a predetermined print request management table. When the print request is registered in the print request management table, the response portion displays, on the terminal device of the one user, a second message requesting the one user who submitted the job to respond whether or not the one user intends to print a print object for the other user in response to the print request.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Next, embodiments of the present disclosure will be described specifically with reference to the drawings.

Figure 1:
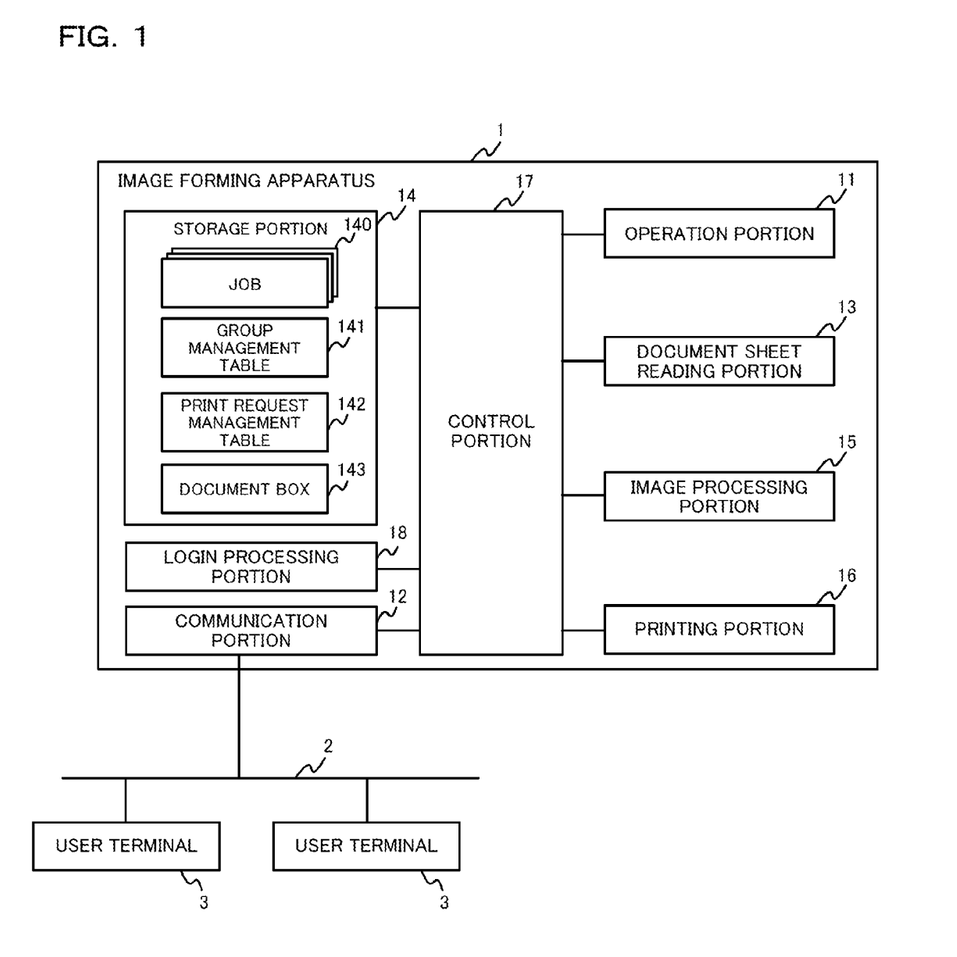
FIG. 1 is a block diagram showing a configuration of an image forming apparatus of an embodiment according to the present disclosure.

An image forming apparatus 1 of an embodiment of the present disclosure is a multifunctional peripheral having a copy function, a scanner function, and a network communication function etc. Referring to FIG. 1, the image forming apparatus 1 includes an operation portion 11, a communication portion 12, a document sheet reading portion 13, a storage portion 14, an image processing portion 15, a printing portion 16, a control portion 17, and a login processing portion 18.

The operation portion 11 is a user interface including various operation keys such as a touch panel, a numerical keypad, a RESET key, a STOP key, an interrupt key, a START key, and the like. The touch panel functions as an input portion and a display portion with a transparent pressure-sensitive sensor disposed on a surface of a liquid crystal display panel.

The communication portion 12 has a function of transmitting and receiving various data to and from multiple user terminal devices 3 via a network 2 such as a LAN.

The document sheet reading portion 13 is a scanner configured to emit light toward a document sheet fed by a document sheet feeding device which is not shown or a document sheet placed on a platen glass by a user, and read a document sheet image after receiving light reflected therefrom etc.

The storage portion 14 is a storage device such as a semiconductor memory and a HDD (Hard Disk Drive). The storage portion 14 is a storage device to which document data read by the document sheet reading portion 13 and document data received from the user terminal devices 3 via the communication portion 12 are accumulated as a job (print job). The job includes user information of a user who submitted the job. A job ID is assigned to the job. In the present embodiment, the document data is a collective term of document information including image data, text data, graphic data, or a combination thereof etc.

On the storage portion 14, a group management table 141, a print request management table 142, and a document box 143 are stored. The storage portion 14 is one example of a group management table storage portion, a print request management table storage portion, and a document data storage portion of the present disclosure.

The group management table 141 is for managing groups to which each preregistered user belongs. For example, a group is set for each department etc. Furthermore, a group may also be set so as to correspond to a security level of document data.

Figure 2:
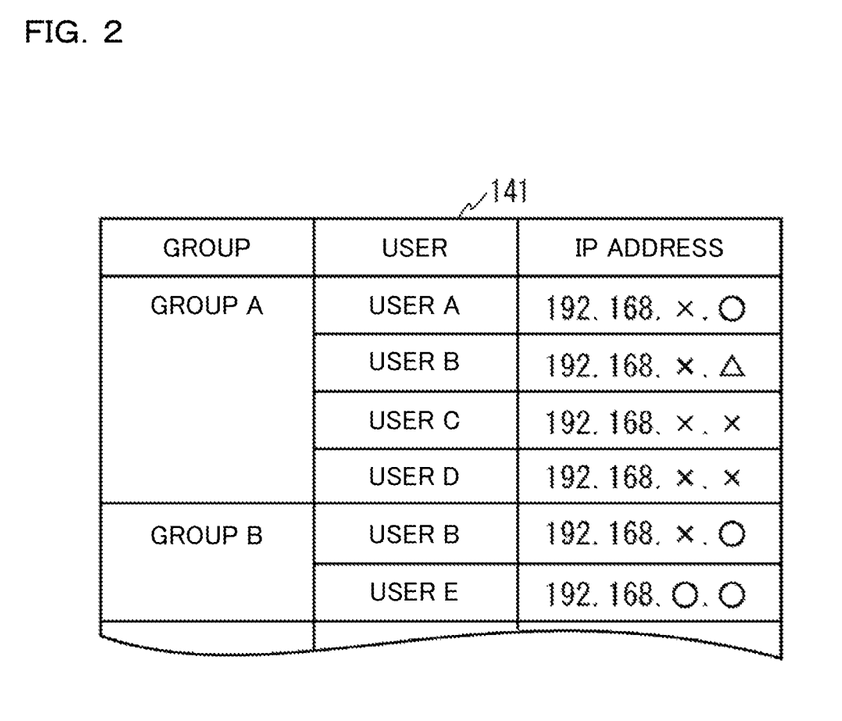
FIG. 2 shows an example of registrations in a group management table shown in FIG. 1.

FIG. 2 shows an example of registrations in the group management table 141. As shown in FIG. 2, the group management table 141 contains group names, user information (user identification information) of users belonging to each group, and IP addresses of the user terminal devices 3 of the respective users. A plurality of users may be registered to each of the groups. In addition, the same user may be registered to a plurality of groups.

In the print request management table 142, a print request received by the communication portion 12 is registered. The print request is made when a user (other user), who is different from a user who submitted a job, wishes to have a document print together with the user who submitted the job for printing the document. The print request management table 142 contains a job ID and user information of a user who made a print request.

The document box 143 is a storage area where the document data is stored in the storage portion 14. The document box 143 has a function of storing the document data of the print-requested job when a print request is made.

The image processing portion 15 performs predetermined image processing on the document data. At the image processing portion 15, image improvement processes such as, for example, scaling process, density adjustment, gradation adjustment, and the like are performed.

The printing portion 16 prints the document data stored in the storage portion 14 as a document image. The printing portion 16 forms a latent image on the surface of a photoconductor drum based on, for example, the document data read from the storage portion 14, performs image formation of forming the latent image into a toner image using a toner, transfers the toner image from the photoconductor drum to a recording sheet, fixes the toner image on the recording sheet, and discharges the recording sheet.

The login processing portion 18 has a function of matching certification information of a user inputted via the operation portion 11 with certification information stored in advance, and accepting a login of the user when the certification information match. In addition, the login processing portion 18 has a function of accepting a logout of the user when a logout operation is performed via the operation portion 11. When a user is logged in, the image forming apparatus 1 is configured to execute a job of the logged-in user.

The control portion 17 is connected to the operation portion 11, the communication portion 12, the document sheet reading portion 13, the storage portion 14, the image processing portion 15, the printing portion 16, and the login processing portion 18. The control portion 17 executes operation control of the whole image forming apparatus 1 in response to predetermined instruction information inputted from the operation portion 11. The control portion 17 is an information processing portion such as a microcomputer including a ROM (Read Only Memory), a RAM (Random Access Memory), and the like. The ROM has stored therein a control program that controls operation of the image forming apparatus 1. The control portion 17 reads out the control program stored in the ROM, and loads the control program on the RAM for controlling the whole apparatus in response to the predetermined instruction information inputted from the operation portion 11. As described in detail in the following, the control portion 17 functions as a notification portion, a response portion, and a response notification portion. In a case where the notification portion has a function of, when a job is submitted by a user, displaying a message (first message) showing information of the document data of the job on another user terminal device 3 (other terminal device) of another user. The response portion has a function of, when a print request is made by a user in response to the first message, displaying a message (second message) on the operation portion 11, and requesting the user who submitted the job to respond to the print request. The response notification portion has a function of displaying a message (third message) showing a response result of the print request on the user terminal device 3 of the user who made the print request.

Next, a flow of processes performed by the image forming apparatus 1 having the above described configuration will be described. In the following, an example in which user A has submitted a job will be described. User A belongs to the same group as users B, C, and D.

Figure 3:
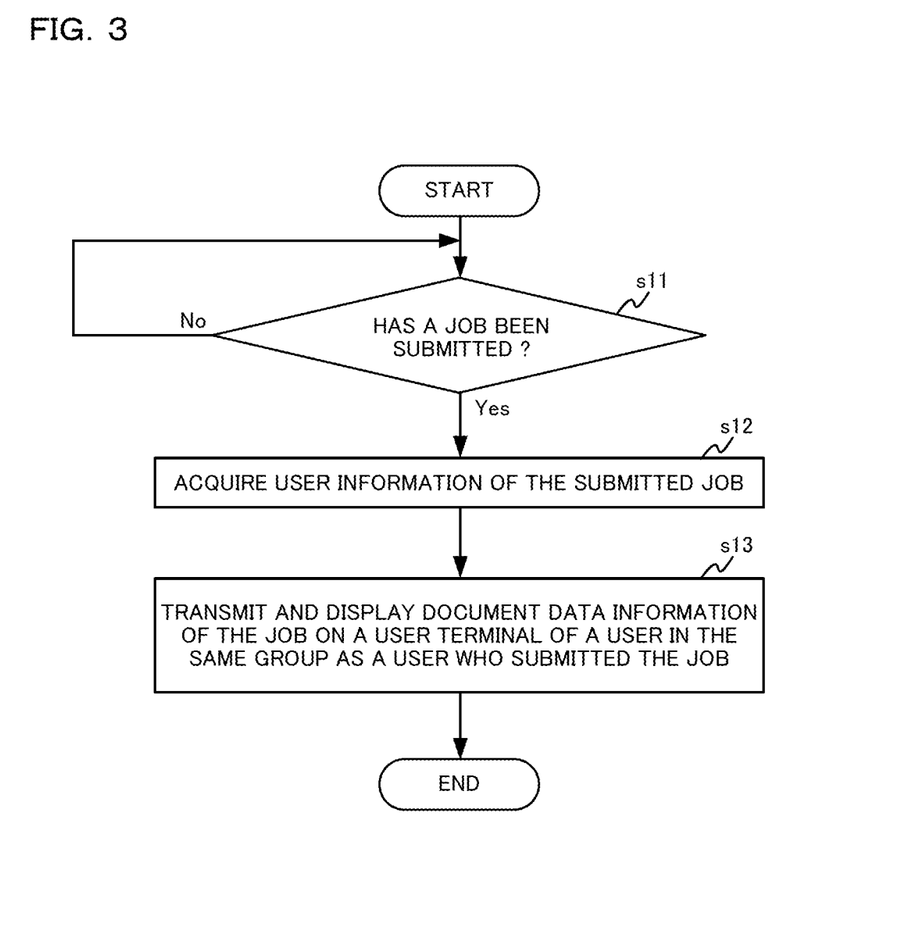
FIG. 3 is a flowchart showing a flow of processes performed by the image forming apparatus when a job shown in FIG. 1 is submitted.

First, with reference to FIG. 3, a flow of processes will be described in which information of the document data of the job submitted by user A is notified to the users in the same group.

The control portion 17 stands by until a job is submitted (No at step S11). When a job is submitted (Yes at step S11), the control portion 17 acquires the user information of the submitted job (step S12). Next, the control portion 17 refers to the group management table 141, and transmits and displays information of the document data of the job of user A on the user terminal devices 3 (other terminal devices) of users (excluding the user who submitted the job) in the same group as the user who submitted the job (step S13). Then, the present processes end.

Figure 4:
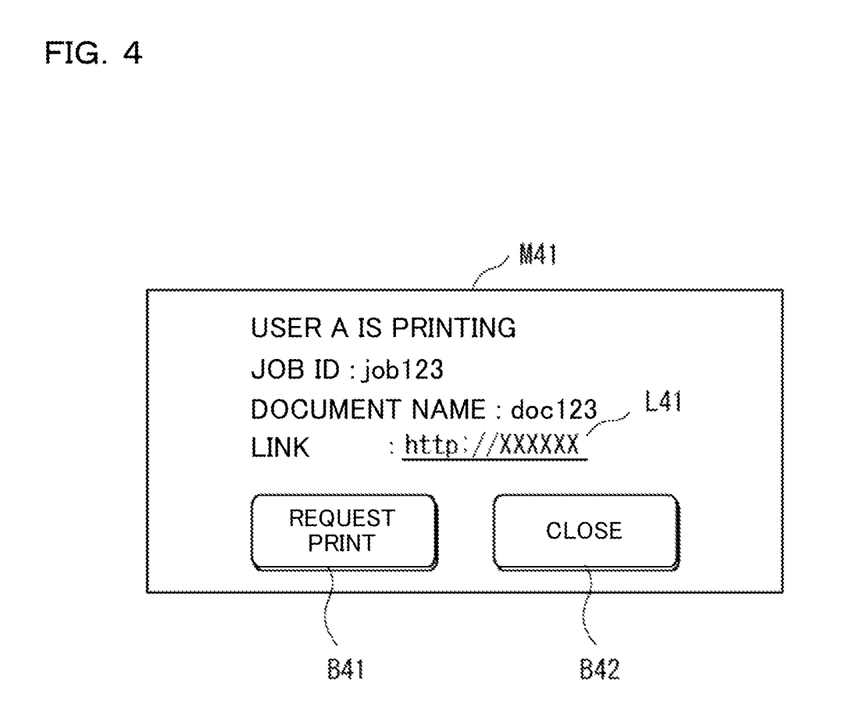
FIG. 4 shows one example of a message displayed on a user terminal device.

As a result, for example, as shown in FIG. 4, a pop-up type message M41 (first message) is displayed on each of the user terminal devices 3 of users B, C, and D. In the message M41, "User A is printing. Job ID: job123. Document name: doc123. Link: http://XXXXX" is displayed, and a button B41 of "Request Print" and a button B42 of "Close" are displayed. The job ID is an ID for identifying the job submitted by user A. The document name is a document name of a document that is being printed by user A. The link L41 is an address of a storage location of the document data.

Users B, C, and D can access the document data by clicking on the link L41 via their respective user terminal devices 3, and can display the document to examine a content thereof. In addition, when one of the users B, C, and D click on the button B41 of "Request Print" via their respective user terminal devices 3, a print request of requesting a print based on the document data of the job of user A is transmitted to the image forming apparatus 1. The print request contains the job ID displayed on the message M41 and user information of a user who made the print request. Furthermore, when users B, C, and D click the button B42 of "Close" via their respective user terminal devices 3, the displayed message M41 can be erased.

Figure 5:
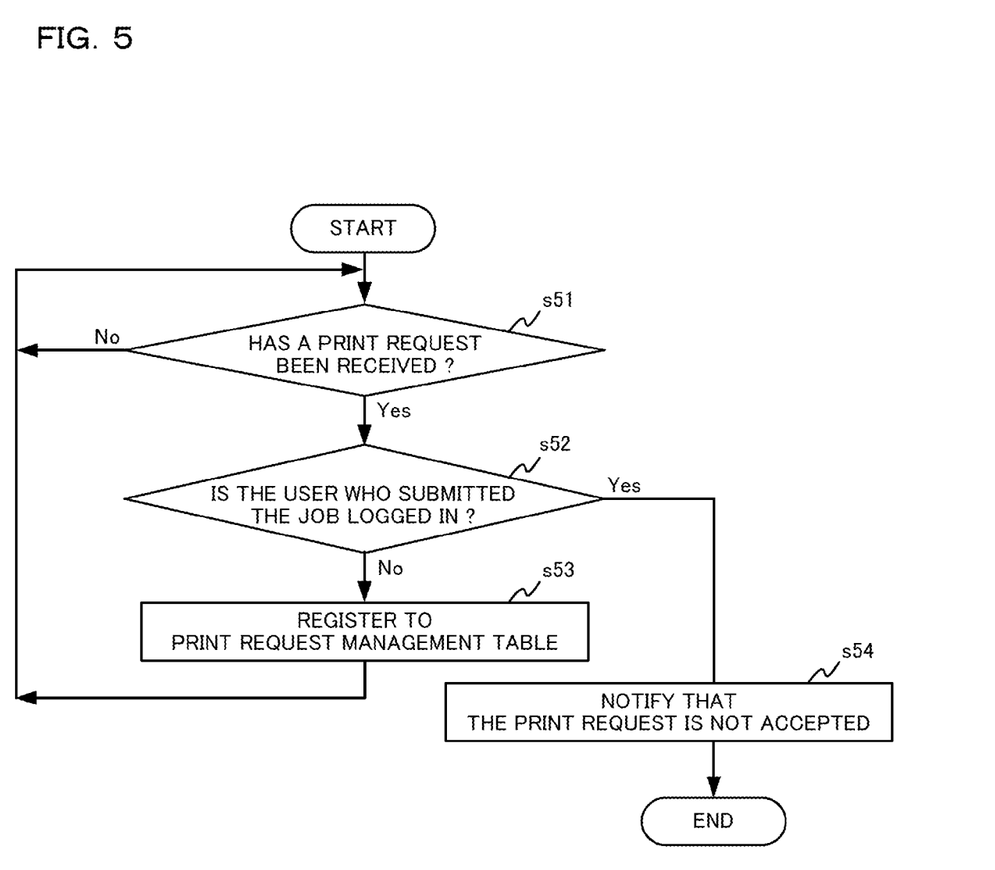
FIG. 5 is a flowchart showing a flow of processes performed by the image forming apparatus when a print request shown in FIG. 1 is received.

FIG. 5 is a flowchart showing a flow of processes in which the image forming apparatus 1 receives the print request. As shown in FIG. 5, the control portion 17 stands by until a print request is received (No at step S51). When the print request is received (Yes at step S51), the control portion 17 determines whether user A who submitted the job is logged in via the login processing portion 18 (step S52). If user A is not logged in (No at step S52), the control portion 17 registers the received print request in the print request management table 142 (step S53), and returns the flow to the process at step S51. On the other hand, if user A is logged in (Yes at step S52), the control portion 17 notifies the user who made the print request that the print request is not accepted (step S54), and the present processes end. In the description above, although the print request is accepted until user A logs in, the print request may be accepted until user A logs out, or may be accepted until the job of user A is finished.

Figure 6:
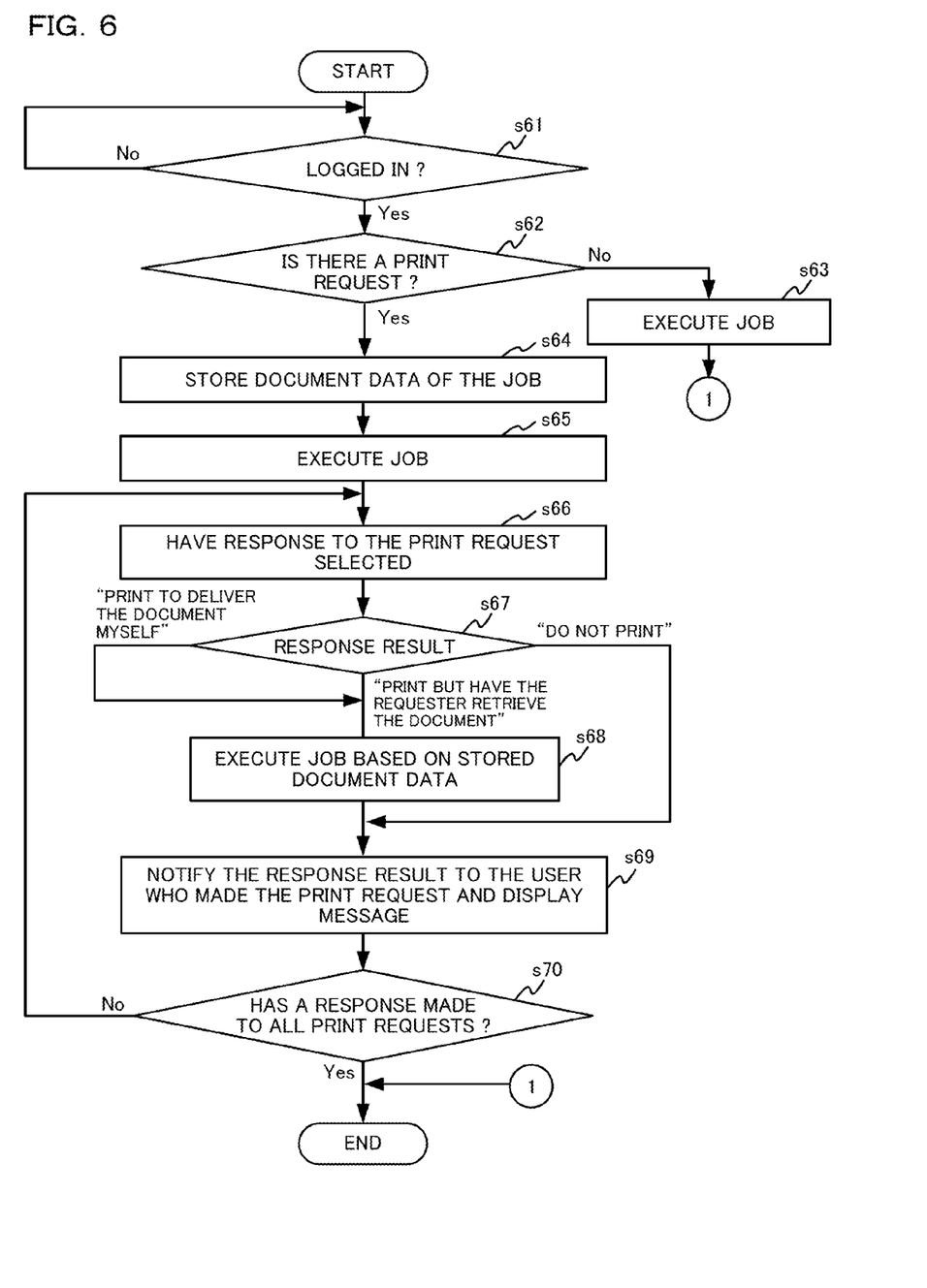
FIG. 6 is a flowchart showing a flow of processes performed when the image forming apparatus shown in FIG. 1 executes the job.

Next, with reference to FIG. 6, a flow of processes performed when user A logs into the image forming apparatus 1 will be described. By logging into the image forming apparatus 1 via the operation portion 11, user A can output a print object associated with the job submitted by himself/herself from the image forming apparatus 1. Here, an example will be described in which a print request is made by user B for the document data of the job of user A.

First, the control portion 17 stands by until user A logs in via the login processing portion 18 (No at step S61). When user A logs in (Yes at step S61), the control portion 17 determines whether a print request has been made for the document data of the job of user A by referring to the print request management table 142 (step S62). When a print request has not been made (No at step S62), the job of user A is executed (step S63), and the present processes end.

On the other hand, when a print request has been made (Yes at step S62), the control portion 17 stores the document data of the job in the document box 143 (step S64), and executes the job of user A (step S65). Next, the control portion 17 displays on the operation portion 11 information indicating that the print request exists, and causes user A to select a response to the print request (step S66).

Figure 7:
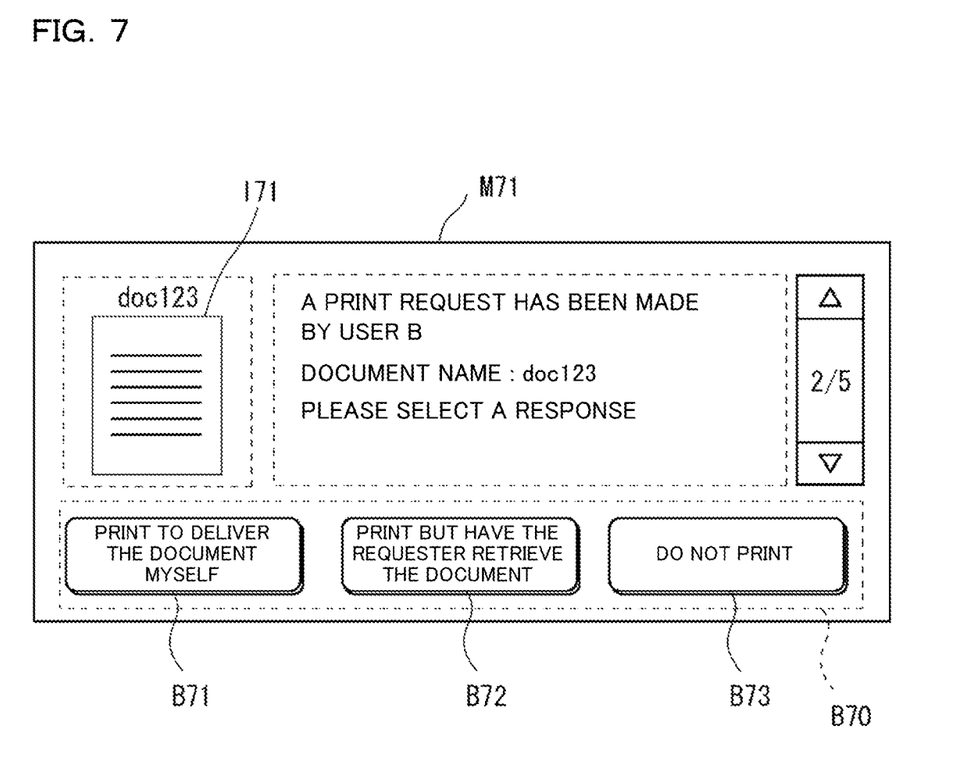
FIG. 7 shows one example of a message displayed on the image forming apparatus.

FIG. 7 shows one example of a message M71 (second message) displayed on the operation portion 11 when the print request exists. On the operation portion 11, "A print request has been made by user B. Document name: doc123. Please select a response." is displayed, and a document image D71 and response buttons B70 for selecting a response to the print request are displayed. The response buttons B70 are a button B71 of "Print to deliver the document myself", a button B72 of "Print but have the requester retrieve the document", and a button B73 of "Do not print". User A selects one of the response buttons B70 to respond to the print request.

If a response result (step S67) is "Print to deliver the document myself" or "Print but have the requester retrieve the document", the control portion 17 executes the job based on the document data stored in the document box 143 (step S68), and advances the process to step S69. At this moment, the print setting for printing the document data may be the same print setting as the job of user A or may be a print setting configured in advance.

If the response result (step S67) is "Do not print", the control portion 17 does not print using the document data, and advances the process to step S69. Next, the control portion 17 notifies the user terminal device 3 of user B about the response result to have a message showing the response result displayed (step S69).

Figure 8A:
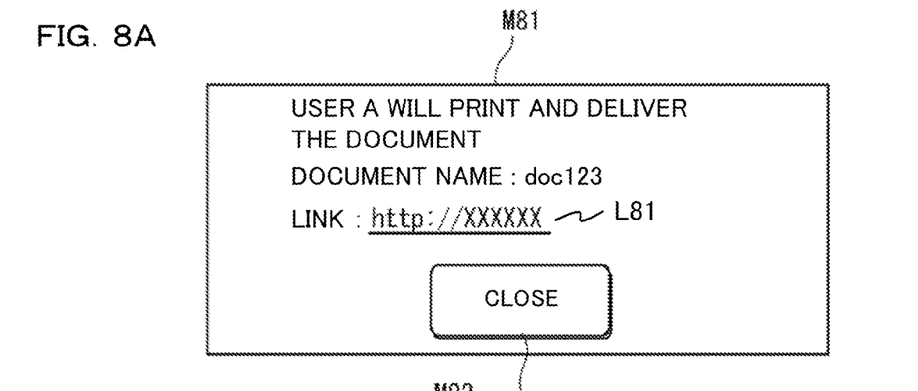
FIGS. 8A to 8C each show one example of a message notifying about a response result, displayed on the user terminal device.
Figure 8B:
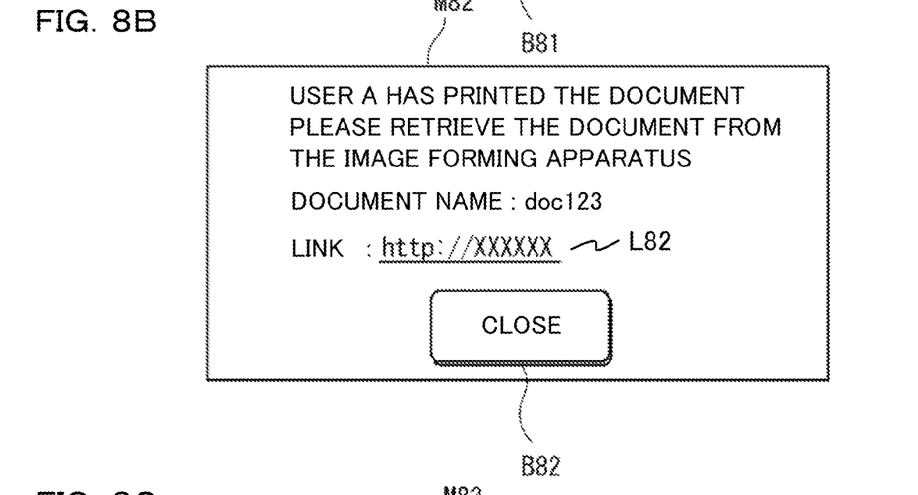
Figure 8C:
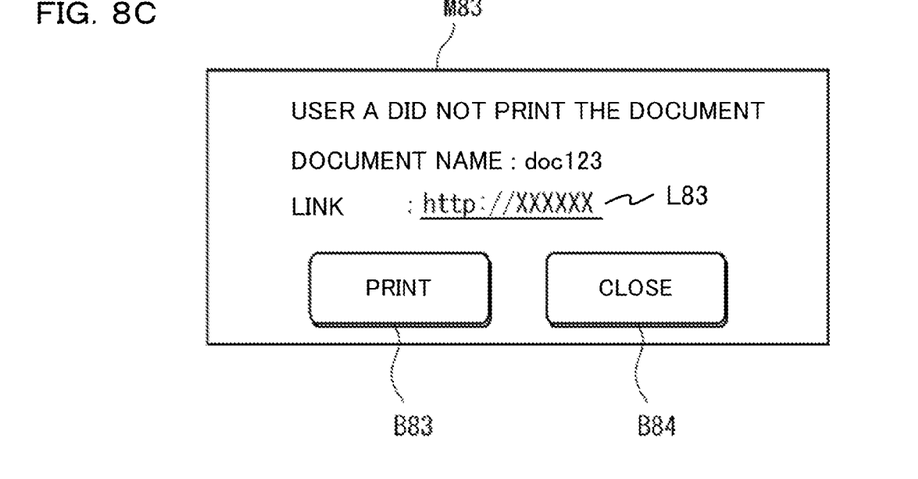

FIGS. 8A to 8C each show one example of a message (third message) showing a response result notified to user B. FIG. 8A shows a message M81 displayed when the response result is "Print to deliver the document myself", FIG. 8B shows a message M82 displayed when the response result is "Print but have the requester retrieve the document", and FIG. 8C shows a message M83 displayed when the response result is "Do not print".

As shown in FIG. 8A, in the message M81 displayed in the case of "Print to deliver the document myself", "User A will print and deliver the document. Document name: doc123.Link: http://XXXXX" is displayed, and a button B81 of "Close" is displayed. As shown in FIG. 8B, in the message M82 displayed in the case of "Print but have the requester retrieve the document", "User A has printed the document. Please retrieve the document from the image forming apparatus 1. Document name: doc123. Link: http://XXXXX" is displayed, and a button B82 of "Close" is displayed. As shown in FIG. 8C, in the message M83 displayed in the case of "Do not print", "User A did not print the document. Document name: doc123. Link: http://XXXXX" is displayed, and a button B83 of "Print" and a button B84 of "Close" are displayed.

The document data can be accessed when link L81, L82, or L83 is clicked, and user B can display the document and examine the content thereof. When the button B81, B82, or B83 of "Close" is clicked, the message M81, M82, or M83 can be closed and erased from a screen of the user terminal device 3. When the button B83 of "Print" is clicked, a job based on the document data of user A stored in the document box 143 is created and submitted to the image forming apparatus 1 as a job by user B. Thus, even when user A does not print the document, user B can easily print the same document as user A. The message M81, M82, or M83 may be displayed as a new pop-up, or may be displayed by changing the content of the message M41 shown in FIG. 4.

Next, the control portion 17 determines whether or not a response has been made to all print requests for the document data of the job of user A (step S70). If a response has not been made to all print requests (No at step S70), the control portion 17 repeats the processes from step S66 to step S70. If a response has been made to all print requests (Yes at step S70), the present processes end.

It should be noted that, when user A logs into the image forming apparatus 1, executes his/her job, and logs out without selecting one of the response buttons B70 in response to the print request; the control portion 17 performs, for a user who has not been notified about a response to the print request, the same process as the case where "Do not print" has been selected as the response result. Furthermore, the process of step S65 for executing the job of user A, and the processes of step S66 to step S70 performed in response to the print request may be performed in parallel.

In conventional representative technologies, even when another user wishes to print the same document as the user who has submitted a job, it has not been possible to print a print object for the other user together with the user who submitted the job. However, as shown in the present disclosure, by performing the above described processes, when the job by user A is submitted, the users belonging to the same group as user A are notified about the information of the document data of the job of user A. Thus, a user, who is in the same group as user A and who wishes to print the document that user A is printing, can have the document printed together with user A by making a print request. In addition, user A can select from "Print to deliver the document myself", "Print but have the requester retrieve the document", and "Do not print" in response to the print request, and notify that to the user who made the print request. For example, user A who submitted the job may select "Print to deliver the document myself" if the print request has been made by a user with walking disability or a user seated nearby. Furthermore, when a print request has been made by multiple users, user A may select "Print but have the requester retrieve the document". In addition, even when user A selects "Do not print", a user who made the print request can submit to the image forming apparatus 1 a job based on the document data stored in the document box 143 by clicking on the button B83 of "Print" in the message M83 shown in FIG. 8C, and thereby can easily print the document printed by user A.

In addition, when a job is submitted to the image forming apparatus 1 based on the document data stored in the document box 143 through the button B83 of "Print" in the message M83, a message notifying information of the document data of the job is displayed on the respective user terminal devices 3 of the users belonging to the same group as the user who submitted the job. Thus, for example, even in a case where users B and C both made a print request to user A but both could not have the document printed, if user C clicks on the button B83 of "Print" in the message M83 and a job based on the document data stored in the document box 143 is submitted, user B can make a print request for the document data of the job submitted by user C.

The present disclosure is not limited to the embodiments described above, and it is needless to say that various modifications can be made without departing from the scope of the present disclosure.

For example, user A who submitted the job and user B who made the print request may transmit messages between each other. For example, when user A selects the button B71 of "Print to deliver the document myself" in response to the print request, user A may input a message of "I will deliver the document in 10 minutes" via the operation portion 11 to be transmitted the user terminal device 3 of user B, and user B who received the message may input a message of "I will be at my seat" via the user terminal device 3 to be transmitted to the image forming apparatus 1 and displayed on the operation portion 11.

In addition, a storage period may be set to the document data stored in the document box 143, and the document data may be automatically deleted by the control portion 17 after the storage period elapses. Furthermore, in the case where the message M83 shown in FIG. 8C is displayed, the control portion 17 may delete the document data stored in the document box 143 after the buttons B84 of "Close" are clicked or after execution of jobs associated with clicking of the buttons B83 of "Print" has been completed in all the displayed messages M83.

In the above described embodiments, although the control portion 17 displays the message M71 shown in FIG. 7 on the operation portion 11 when user A logs into the image forming apparatus 1 to have user A select a response to the print request, the message M71 may be displayed also on the user terminal device 3 of user A to request for a response. Specifically, when the print request for the job of the user A is registered in the print request management table 142, the control portion 17 displays the message M71 on the user terminal device 3 of user A. When user A clicks on one of the buttons B71, B72, or B73 on the message M71 displayed on the user terminal device 3, a response corresponding to the clicked button B71, B72, or B73 is transmitted to the image forming apparatus 1. The control portion 17 receives the response by user A from the user terminal device 3 via the communication portion 12, and registers the response in the print request management table 142 as a response by user A to a user who made the print request. Then, when user A logs into the image forming apparatus 1, as a process in response to the print request, the control portion 17 may perform, if a response is not registered in the print request management table 142, the process of displaying the message M71 on the operation portion 11 to cause user A select a response, or, if a response is registered in the print request management table 142, the process in accordance with the response registered in the print request management table 142 without displaying the message M71 on the operation portion 11.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a communication portion executed by a processor, configured to enable transmission and reception of data among respective terminal devices of multiple users;
a notification portion executed by the processor, configured to, when a job is submitted from a terminal device of one user among the terminal devices of the multiple users, display a first message associated with the job on another terminal device of another user among the terminal devices of the multiple users;
a print request management table storage portion executed by the processor, configured to, when a print request is transmitted from the another terminal device of the another user in response to the first message, register and store the print request in a predetermined print request management table; and
a response portion executed by the processor, configured to, when the print request is registered in the print request management table, display, on the terminal device of the one user, a second message requesting the one user who submitted the job to provide a response whether or not the one user intends to print a print object for the another user in response to the print request;
wherein when the one user who submitted the job makes a response, from the terminal device, indicating an intention of the one user to print a print object for the another user, the image forming apparatus prints a print object for the one user who submitted the job and for the another user.

2. The image forming apparatus according to claim 1, wherein the response portion displays, on the terminal device of the one user, the second message providing a selection among: a response indicating an intention of the one user to print the print object for the another user who transmitted the print request and deliver the print object to the another user; a response indicating an intention of the one user to print the print object for the another user who transmitted the print request but have the another user retrieve the print object; and a response indicating an intention of the one user to not print the print object for the another user who transmitted the print request.

3. The image forming apparatus according to claim 1, wherein the response portion displays the second message on the terminal device of the one user when the one user who submitted the job logs in from the terminal device.

4. The image forming apparatus according to claim 1, further comprising a group management table storage portion executed by the processor, configured to store a group management table having registered therein a group in which the multiple users belong, wherein
the notification portion displays the first message associated with the job on the another terminal device of the another user belonging to the group same as that of the one user who submitted the job.

5. The image forming apparatus according to claim 1, further comprising a response notification portion executed by the processor, configured to display a third message associated with the response of the one user who submitted the job, on the another terminal device of the another user who transmitted the print request.

6. The image forming apparatus according to claim 5, further comprising a document data storage portion executed by the processor, configured to store document data of the job for which the print request has been made, wherein
the response notification portion displays, when a response is made indicating an intention of the one user to not printing a print object for the another user who transmitted the print request, on the another terminal device the third message enabling the another user who transmitted the print request to submit a job based on the document data stored in the document data storage portion.

* * * * *